US008819734B2

(12) United States Patent
Moreau et al.

(10) Patent No.: US 8,819,734 B2
(45) Date of Patent: Aug. 26, 2014

(54) CONTEXTUAL NAVIGATIONAL CONTROL FOR DIGITAL TELEVISION

(75) Inventors: Samuel Moreau, Mill Valley, CA (US); John Carney, Corte Madera, CA (US)

(73) Assignee: TVWorks, LLC, Philadelphia, PA (US)

( * ) Notice: Subject to any disclaimer, the term of this patent is extended or adjusted under 35 U.S.C. 154(b) by 988 days.

(21) Appl. No.: 10/925,737

(22) Filed: Aug. 24, 2004

(65) Prior Publication Data

US 2005/0125827 A1 Jun. 9, 2005

Related U.S. Application Data

(63) Continuation-in-part of application No. 10/664,275, filed on Sep. 16, 2003.

(60) Provisional application No. 60/552,998, filed on Mar. 11, 2004.

(51) Int. Cl.
*H04N 5/445* (2011.01)

(52) U.S. Cl.
USPC .................... 725/44; 725/39; 725/45; 725/47

(58) Field of Classification Search
USPC ................... 725/44–46, 52–53, 100
See application file for complete search history.

(56) References Cited

U.S. PATENT DOCUMENTS

| | | |
|---|---|---|
| 5,287,489 A | 2/1994 | Nimmo et al. |
| 5,321,750 A | 6/1994 | Nadan |
| 5,485,221 A | 1/1996 | Banker |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A * | 1/1997 | Florin et al. ............ 725/43 |
| 5,613,057 A | 3/1997 | Caravel |
| 5,621,456 A * | 4/1997 | Florin et al. ............ 725/43 |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette |
| 5,826,102 A | 10/1998 | Escobar |

(Continued)

FOREIGN PATENT DOCUMENTS

| | | |
|---|---|---|
| EP | 0624039 A2 | 11/1994 |
| EP | 0624039 A3 | 11/1994 |

(Continued)

OTHER PUBLICATIONS

Office Action in U.S. Appl. No. 12/730,771, dated Oct. 5, 2010.

(Continued)

*Primary Examiner* — Cai Chen
(74) *Attorney, Agent, or Firm* — Banner & Witcoff, Ltd.

(57) ABSTRACT

A contextual navigational control for digital television is described. An apparatus, comprises a contextual navigation control interface (CNCI). The CNCI includes a first area that represents a plurality of cable television programs having a first level of relevance. A second area represents a first group of the plurality of programs having a second level of relevance. A third area represents a first subgroup of the first group having a third level of relevance. A fourth area represents a second subgroup of the first group having a fourth level of relevance. There may be additional areas representing additional sub-groups of relevance to the current viewing context.

17 Claims, 7 Drawing Sheets

(56) References Cited

U.S. PATENT DOCUMENTS

| | | |
|---|---|---|
| 5,844,620 A | 12/1998 | Coleman et al. |
| 5,850,218 A * | 12/1998 | LaJoie et al. .................. 725/45 |
| 5,852,435 A | 12/1998 | Vigneaux |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt |
| 5,905,492 A | 5/1999 | Straub et al. |
| 5,929,849 A | 7/1999 | Kikinis |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,803 A * | 12/1999 | Rowe et al. ............. 348/E5.105 |
| 6,008,836 A | 12/1999 | Bruck et al. |
| 6,016,144 A | 1/2000 | Blonstein et al. |
| 6,025,837 A | 2/2000 | Matthews, III et al. |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen |
| 6,426,779 B1 | 7/2002 | Noguchi et al. |
| 6,442,755 B1 | 8/2002 | Lemmons |
| 6,477,705 B1 * | 11/2002 | Yuen et al. .................. 725/41 |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 * | 1/2004 | Wilcox et al. .................. 725/42 |
| 6,684,400 B1 | 1/2004 | Goode et al. |
| 6,731,310 B2 | 5/2004 | Craycroft et al. |
| 6,760,043 B2 | 7/2004 | Markel |
| 6,763,522 B1 | 7/2004 | Kondo |
| 6,766,526 B1 * | 7/2004 | Ellis .................. 725/57 |
| 6,806,887 B2 | 10/2004 | Chernock et al. |
| 6,857,128 B1 | 2/2005 | Borden, IV et al. |
| 6,910,191 B2 * | 6/2005 | Segerberg et al. ............ 715/830 |
| 6,918,131 B1 | 7/2005 | Rautila et al. |
| 7,028,327 B1 | 4/2006 | Dougherty et al. |
| 7,065,785 B1 | 6/2006 | Shaffer et al. |
| 7,103,904 B1 | 9/2006 | Blackketter et al. |
| 7,114,170 B2 | 9/2006 | Harris |
| 7,152,236 B1 | 12/2006 | Wugofski et al. |
| 7,162,694 B2 | 1/2007 | Venolia |
| 7,162,697 B2 | 1/2007 | Markel |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,305,696 B2 | 12/2007 | Thomas et al. |
| 7,337,457 B2 | 2/2008 | Pack |
| 7,360,232 B2 | 4/2008 | Mitchell |
| 7,363,612 B2 | 4/2008 | Satuloori |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,516,468 B1 | 4/2009 | Deller |
| 7,587,415 B2 | 9/2009 | Gaurav et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,958,528 B2 | 6/2011 | Moreau et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0041104 A1 | 4/2002 | Graf et al. |
| 2002/0042915 A1 | 4/2002 | Kubischta et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin |
| 2002/0083450 A1 | 6/2002 | Kamen et al. |
| 2002/0100041 A1 | 7/2002 | Rosenberg et al. |
| 2002/0107973 A1 | 8/2002 | Lennon et al. |
| 2002/0108122 A1 | 8/2002 | Alao et al. |
| 2002/0124254 A1 | 9/2002 | Kikinis |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0196268 A1 | 12/2002 | Wolff et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 * | 1/2003 | Zaslavsky et al. .............. 725/40 |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0066081 A1 | 4/2003 | Barone, Jr. et al. |
| 2003/0067554 A1 | 4/2003 | Klarfeld |
| 2003/0070170 A1 | 4/2003 | Lennon |
| 2003/0079226 A1 | 4/2003 | Barrett |
| 2003/0084443 A1 | 5/2003 | Laughlin et al. |

(56) References Cited

U.S. PATENT DOCUMENTS

| | | |
|---|---|---|
| 2003/0084444 A1 | 5/2003 | Ullman |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb |
| 2003/0097657 A1 | 5/2003 | Zhou et al. |
| 2003/0110503 A1 | 6/2003 | Perkes |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0140097 A1 | 7/2003 | Schloer |
| 2003/0151621 A1 | 8/2003 | McEvilly et al. |
| 2003/0172370 A1 | 9/2003 | Satuloori et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0229899 A1 | 12/2003 | Thompson et al. |
| 2004/0003402 A1 | 1/2004 | McKenna |
| 2004/0019900 A1 | 1/2004 | Knightbridge et al. |
| 2004/0019908 A1 | 1/2004 | Williams et al. |
| 2004/0031015 A1 | 2/2004 | Ben-Romdhane et al. |
| 2004/0039754 A1 | 2/2004 | Harple |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0133923 A1 | 7/2004 | Watson et al. |
| 2004/0136698 A1 | 7/2004 | Mock |
| 2004/0172648 A1 | 9/2004 | Xu et al. |
| 2004/0194136 A1 | 9/2004 | Finseth et al. |
| 2004/0221306 A1 | 11/2004 | Noh |
| 2004/0226051 A1 | 11/2004 | Carney et al. |
| 2005/0005288 A1 | 1/2005 | Novak |
| 2005/0015804 A1 | 1/2005 | LaJoie et al. |
| 2005/0086172 A1 | 4/2005 | Stefik |
| 2005/0149972 A1 | 7/2005 | Knudson |
| 2005/0155063 A1 | 7/2005 | Bayrakeri et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0059525 A1 | 3/2006 | Jerding et al. |
| 2006/0080707 A1 | 4/2006 | Laksono |
| 2006/0206912 A1 | 9/2006 | Klarfeld et al. |
| 2006/0248572 A1 | 11/2006 | Kitsukama et al. |
| 2007/0271587 A1 | 11/2007 | Rowe |
| 2008/0037722 A1 | 2/2008 | Klassen |
| 2008/0060011 A1 | 3/2008 | Kelts |
| 2008/0189740 A1 | 8/2008 | Carpenter et al. |
| 2008/0196070 A1 | 8/2008 | White et al. |
| 2008/0235725 A1 | 9/2008 | Hendricks |
| 2008/0276278 A1 | 11/2008 | Krieger et al. |
| 2008/0288644 A1 | 11/2008 | Gilfix et al. |
| 2009/0019485 A1 | 1/2009 | Ellis et al. |
| 2009/0024629 A1 | 1/2009 | Miyauchi |
| 2009/0094632 A1 | 4/2009 | Newnam |
| 2009/0164904 A1 | 6/2009 | Horowitz et al. |
| 2009/0222872 A1 | 9/2009 | Schlack |
| 2009/0228441 A1 | 9/2009 | Sandvik |
| 2009/0292548 A1 | 11/2009 | Van Court |
| 2010/0175084 A1 | 7/2010 | Ellis et al. |
| 2010/0223640 A1 | 9/2010 | Reichardt et al. |
| 2010/0251284 A1 | 9/2010 | Ellis et al. |
| 2011/0087348 A1 | 4/2011 | Wong |
| 2011/0093909 A1 | 4/2011 | Roberts et al. |
| 2011/0209180 A1 | 8/2011 | Ellis et al. |
| 2011/0214143 A1 | 9/2011 | Rits et al. |
| 2011/0219419 A1 | 9/2011 | Reisman |

FOREIGN PATENT DOCUMENTS

| | | |
|---|---|---|
| EP | 0963115 | 12/1999 |
| EP | 0963115 A1 | 12/1999 |
| EP | 1058999 A1 | 12/2000 |
| EP | 1080582 A1 | 3/2001 |
| EP | 1080582 | 3/2003 |
| EP | 1058999 | 4/2003 |
| GB | 2323489 A | 9/1998 |
| WO | 99/63757 | 12/1999 |
| WO | 9963757 A1 | 12/1999 |
| WO | 0011869 | 3/2000 |
| WO | 0011869 A1 | 3/2000 |
| WO | 00/33576 | 6/2000 |
| WO | 0033576 | 6/2000 |
| WO | 0033576 A1 | 6/2000 |
| WO | 0110115 A1 | 2/2001 |
| WO | 0182613 | 11/2001 |
| WO | 0182613 A1 | 11/2001 |
| WO | 02063426 | 8/2002 |
| WO | 02063471 | 8/2002 |
| WO | 02063851 | 8/2002 |
| WO | 02063878 | 8/2002 |
| WO | 03/009126 | 1/2003 |
| WO | 03009126 A1 | 1/2003 |
| WO | 03/026275 A2 | 3/2003 |

OTHER PUBLICATIONS

Sylvain Devillers, "Bitstream Syntax Definition Language: an Input to MPEG-21 Content Representation", Mar. 2001, ISO, ISO/IEC JTC1/SC29/WG11 MPEG01/M7053.

Fernando Periera, "The MPEG-4 Book", Prentice Hall, Jul. 10, 2002.

Michael Adams, "Open Cable Architecture", Cisco Press, Dec. 3, 1999.

Mark Riehl, "XML and Peri", Sams, Oct. 16, 2002.

Office Action in U.S. Appl. No. 10/390,064 dated Nov. 8, 2010.

Office Action in U.S. Appl. No. 10/247,901 dated Oct. 13, 2010.

MetaTV, Inc., PCT/US02/29917 filed Sep. 19, 2002, International Search Report dated Apr. 14, 2003; ISA/US; 6 pages.

Andreas Kraft and Klaus Hofrichter, "An Approach for Script-Based Broadcast Application Production", Springer-Verlag Brling Heidelberg, pp. 74-82, 1999.

Office Action in U.S. Appl. No. 10/618,210 dated Jun. 28, 2010.

Office Action in U.S. Appl. No. 11/381,508 dated Mar. 16, 2010.

Office Action in U.S. Appl. No. 10/390,064 dated Apr. 12, 2010.

Office Action in U.S. Appl. No. 10/630,815 dated Apr. 13, 2010.

Office Action in U.S. Appl. No. 10/672,983 dated Jul. 20, 2010.

Office Action in U.S. Appl. No. 10/618,210 dated Jan. 21, 2010.

Office Action in U.S. Appl. No. 10/630,815 dated Jul. 9, 2008.

Office Action in U.S. Appl. No. 10/390,064 dated Jan. 25, 2008.

Shim, et al., "A SMIL Based Graphical Interface for Interactive TV", Internet Tech. Laboratory Dept. of Comp. Engineering, San Jose State University, pp. 257-266.

Office Action in U.S. Appl. No. 10/390,064 dated Sep. 4, 2008.

Office Action in U.S. Appl. No. 10/390,064 dated Oct. 27, 2009.

Office Action in U.S. Appl. No. 10/390,064 dated May 13, 2009.

Office Action in U.S. Appl. No. 10/247,901 dated Apr. 9, 2010.

Office Action in U.S. Appl. No. 10/618,210 dated Jan. 25, 2011.

Office Action in U.S. Appl. No. 10/618,210 dated Nov. 21, 2008.

Office Action in U.S. Appl. No. 10/618,210 dated Jun. 8, 2009.

Office Action in U.S. Appl. No. 10/618,210 dated Jun. 6, 2008.

Office Action in U.S. Appl. No. 10/672,983 dated Mar. 30, 2011.

Office Action in U.S. Appl. No. 10/672,983 dated Dec. 8, 2009.

Office Action in U.S. Appl. No. 10/672,983 dated Jan. 13, 2009.

Office Action in U.S. Appl. No. 10/672,983 dated Jun. 12, 2008.

Office Action in U.S. Appl. No. 10/672,983 dated Jun. 29, 2009.

Office Action in U.S. Appl. No. 10/630,815 dated Apr. 21, 2011.

Office Action in U.S. Appl. No. 10/630,815 dated Oct. 5, 2009.

Office Action in U.S. Appl. No. 10/630,815 dated Dec. 24, 2008.

Office Action in U.S. Appl. No. 10/630,815 dated Nov. 28, 2007.

Office Action in U.S. Appl. No. 10/933,845 dated Jun. 23, 2010.

Office Action in U.S. Appl. No. 10/933,845 dated Nov. 24, 2009.

Office Action in U.S. Appl. No. 10/933,845 dated Dec. 13, 2007.

Office Action in U.S. Appl. No. 10/933,845 dated Jul. 9, 2008.

Office Action in U.S. Appl. No. 10/933,845 dated Jul. 6, 2011.

Office Action in U.S. Appl. No. 10/618,210 dated Jul. 11, 2011.

Office Action in U.S. Appl. No. 10/247,901 dated Aug. 11, 2011.

Office Action in U.S. Appl. No. 10/618,210, dated Oct. 4, 2007.

(56) References Cited

OTHER PUBLICATIONS

Office Action in U.S. Appl. No. 10/894,740, dated Mar. 10, 2011.
Office Action in U.S. Appl. No. 10/894,740, dated Jul. 7, 2011.
Office Action in U.S. Appl. No. 10/894,740, dated Oct. 14, 2010.
Office Action in U.S. Appl. No. 10/933,845 dated Oct. 19, 2011.
Office Action in U.S. Appl. No. 10/672,983 dated Oct. 25, 2011.
Yoon, et al., "Video Gadget: MPET-7 Based Audio-Visual Content Indexing and Browsing Engine", LG Electronics Institute of Technology, pp. 59-68.
U.S. Appl. No. 10/460,950, filed Jun. 12, 2003.
Office Action in U.S. Appl. No. 09/841,149 dated Nov. 8, 2010.
Watchwith webpage; http://www.watchwith.com/content_owners/watchwith_plalform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

* cited by examiner

CONTEXTUAL NAVIGATIONAL CONTROL FOR DIGITAL TELEVISION

RELATED APPLICATIONS

The present application is a Continuation-in-Part, claims the priority benefit of and incorporates by reference U.S. patent application Ser. No. 10/664,275, filed Sep. 16, 2003, entitled: System and Method For Construction, Delivery and Display of iTV Applications that Blend Programming Information of On-Demand and Broadcast Service Offerings, assigned to the assignee of the present application. Additionally, the present application claims the priority benefit of and incorporates by reference U.S. Provisional Patent Application No. 60/552,998, filed Mar. 11, 2004, entitled: Contextual Navigational Control for Digital Television, also assigned to the assignee of the present application.

FIELD OF THE INVENTION

The present invention relates to systems and methods for presenting navigation and control of television viewing services.

BACKGROUND

Interactive television (iTV) is currently available in varying forms. At the core of iTV applications are the navigation applications provided to subscribers to assist in the discovery and selection of television programming. Currently available methods and systems for browsing and selecting broadcast (linear television) are known as interactive program guides (IPGs)—or electronic program guides (EPGs). Current IPGs allow the subscriber to browse and select linear broadcast programming. These IPGs also include the ability to subset the broadcast linear program listing data by subject or type of programming.

In addition to linear broadcast television, subscribers may now also be given opportunities to select from a list of programs that are not linear, but instead are provided on demand. Such technology is generally referred to as Video on Demand (VOD). The current schemes for browsing and selecting VOD programs include the ability to select such programming from categories of programming.

Due to advances in technologies such as data compression, system operators such as cable multiple system operators (MSOs) and satellite operators are able to send more and more broadcast channels and on-demand content over their systems. This in turn has prompted broadcast content providers and programmers to develop more and more channels and on-demand content offerings. Also, the addition of digital video recorder (DVR) technology to set-top boxes (STBs) now provide additional options for time-shifted viewing of broadcast TV and increasing options for the storage of VOD titles that have been purchased for viewing, or likely-to-purchase.

The current television navigational structure is predicated on the numeric channel lineup where a channel's position is determined arbitrarily for each MSO system and without regard for clustering content type or brand. To the TV viewer, this is also manifested in the grid-based navigational tools as they are generally structured in a time-by-channel grid format. As a navigational model, this has become outdated with the increasing number of channels (500+). The problem is further exacerbated with the addition of non-linear (non time-based) On-Demand and time-shifted (DVR) content and other interactive applications such as games.

With these increasing number of TV viewing options comes a complexity of navigating the options to find something to watch. There are generally two types of viewers. One type of viewer knows the type of content they want to watch and are searching for an instance of that type of content. This is exemplified by a viewer who, wanting to watch an action film, wishes to browse available action films. The second type of viewer is one that has no specific notion of what they want to watch—they just want to find something interesting to them in a more impulse oriented manner.

The current state of technology for browsing for TV content includes searching lists of content underneath category heading or browsing large lists or grids of data to find content, or typing in search criteria. Each of these browse methods are referred to in this document as content search points. Content search points include IPG's and EPG's, Movies-On-Demand applications, text search, DVR recorded shows listings, and Category Applications as specified in the above-cited patent application. Current technology also consists of menus and toolbars that allow one to jump to the various content search points. The problem with current technology is that due to the large amount of content on the Digital TV service, the menus and toolbars themselves are becoming either long lists of specific content that are difficult to search, or short lists of general categories that do not provide quick access to specific needs. Thus, the new features of digital television, new content types and the sheer volume of viewing options warrant a new navigational model for viewing television.

SUMMARY

A contextual navigational control for digital television is described. In one embodiment a contextual navigation control interface (CNCI) includes a first area that represents a plurality of cable television programs having a first level of relevance. A second area represents a first group of the plurality of programs having a second level of relevance. A third area represents a first subgroup of the first group having a third level of relevance. A fourth area represents a second subgroup of the first group having a fourth level of relevance. There may be additional areas representing additional subgroups of relevance to the current viewing context.

BRIEF DESCRIPTION OF THE DRAWINGS

The present invention will be understood and appreciated more fully from the following detailed description taken in conjunction with the drawings in which.

DETAILED DESCRIPTION

Figure 1:
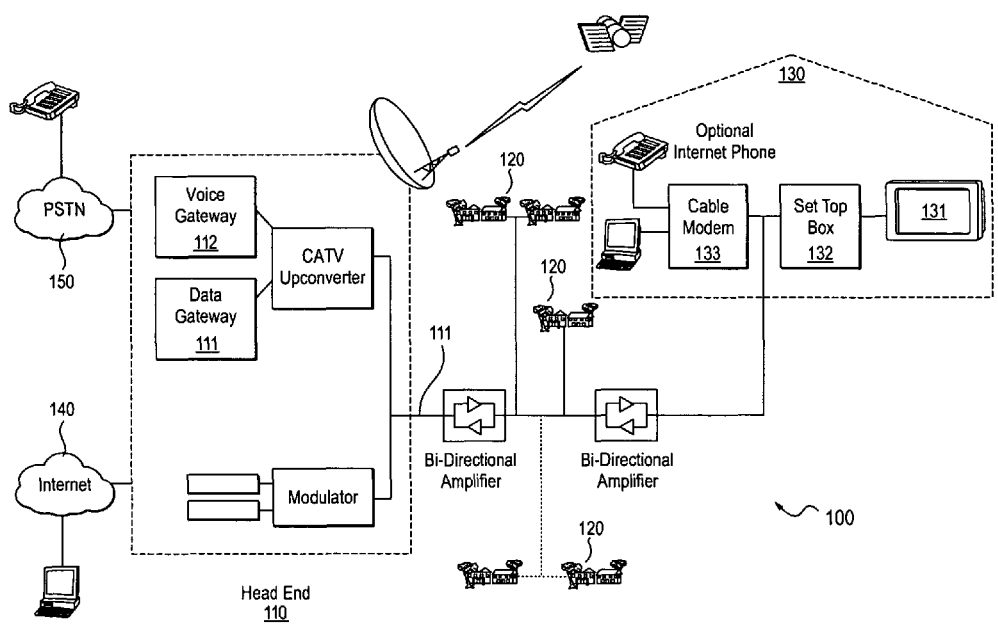
FIG. 1 illustrates an exemplary two-way cable television system that provides contextual navigational control for digital television, according to one embodiment of the present invention.

The present invention provides, in various embodiments, systems and methods by which subscribers are presented with a dynamic navigational interface for linking to content. This dynamic navigational interface speeds access to content by providing a minimal graphical interface and by first presenting contextual options to the viewer that are relevant to the currently viewed program, channel, provider or genre of same. The contextual options are further divided in the user presentation along multiple levels or dimensions from general to more specific relative to the currently viewed content.

Described herein are systems and methods by which subscribers are presented with dynamic iTV navigational hierarchies that first present navigational options based on relevance to the available content on television, and to the currently viewed program, channel, provider or genre of program, channel or provider. In current navigational systems users are provided menus from which they can select a target content search point. These menus are either presented as long lists of options or as very short lists. The long lists provide greater subdivision of content but create a navigational obstacle in that the lists must be scanned to find a link to a specific content of interest. The short lists provide content search points that are much too general such that if the link is selected, the viewer is taken to yet another page for further categorization or the viewer is presented with a large set of content that must be browsed. The present invention enables the quick access to multiple levels of granularity of content categorization on a single menu, by using the context of the currently viewed program to set the state of the navigational control when displayed.

In the following description, for purposes of explanation, numerous specific details are set forth in order to provide a thorough understanding of the present invention. It will be evident, however, to one skilled in the art that the present invention may be practiced without these specific details. As one example, the terms subscriber, user, viewer are used interchangeably throughout this description. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, datum, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

An Exemplary Cable Television System

FIG. 1 illustrates an exemplary two-way cable television system that provides contextual navigational control for digital television, according to one embodiment of the present invention. Generally, cable television system (CATV) 100 provides video and data services through a network of high bandwidth coaxial cables and fibers. The cable system includes a head-end amplifier 110 that combines the broadcast and data signals for transmission to the subscribers. The head-end 110 is connected to fiber or coax trunks 111 that carry the signals into the neighborhoods 120 where they are tapped off to provide service to the residence 130.

The head-end 110 is the initial distribution center for a CATV system 100. The head-end 110 is where incoming video and television signal sources (e.g., video tape, satellites, local studios) are received, amplified and modulated onto TV carrier channels for transmission on the CATV cabling system. The cable distribution system is a cable (fiber or coax) that is used to transfer signals from the head-end 110 to the end-users. The cable is attached to the television 131 through a set-top box 132. The set-top box 132 adapts the signals from the head-end 110 to a format suitable for the television 131. Additionally, the set-top box 132 renders a user interface through which the end-user navigates through menus to select programming to view.

CATV system 100 allows two-way data transmission. Data is provided by a cable modem 133 in the residence 130 and data gateway (cable modem termination system (CMTS)) 111 at the head-end 110. The CMTS 111 also provides an interface to other networks such as the Internet 140. Furthermore, CATV system 100 allows cable telephony to initiate, process and receive voice communications. Telephony is provided by a voice gateway 112 at the head-end 110 that converts communication signals between data networks and telephone networks (e.g., PSTN) 150. The data and telephony attributes of CATV system 100 described above, are for the reader's benefit to appreciate the entire CATV system 100. However, the present system for contextual navigational control may be mainly associated with the digital television content delivery aspects of CATV system 100.

To further understand the present invention consider that all content has descriptive attributes. For example, the show "Sopranos" could be described by the following four attributes: HBO, Drama, Primetime, Crime. These attribute dimensions, namely Provider, Genre, Time of Day and Content are chosen purely for illustration, and additional categories or dimension could easily be identified. The type and number of attributes is variable and may be unique to an article of content. In the navigational model described by this invention, these attributes are the doorways to other content of interest based on the notion that what the viewer is watching has some basic attributes that are of interest to the viewer and can be predictive of where the viewer may wish to navigate.

Figure 2:
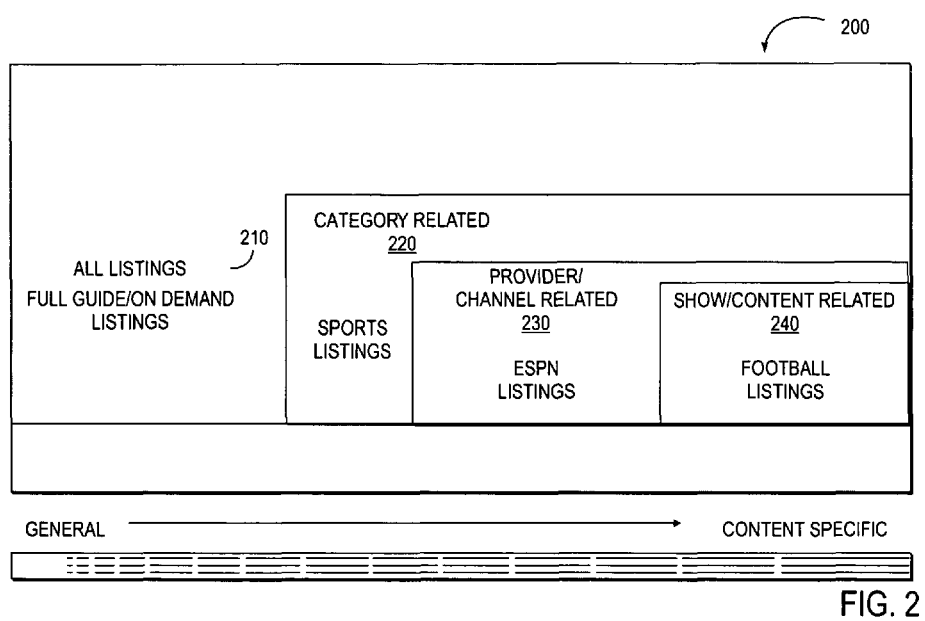
FIG. 2 illustrates four dimensions of programming contextual relevance, according to one embodiment of the present invention.

In one embodiment, the present contextual navigational control has four selection dimensions, or levels, with increasing contextual relevance to the currently broadcast program. FIG. 2 illustrates four dimensions of programming contextual relevance, according to one embodiment of the present invention. The four dimensions 200 or levels of navigation begin with the most general and proceed to the most content specific navigation that link context to the current content being viewed. These dimensions are:
  a All Listings (non-filtered) Related Links 210
  b Category Related Links 220
  c Channel/Provider Related Links 230
  d Snow/Content Related Links 240

FIG. 2 illustrates how programming choices available to the viewer range from the most general or all programming choices, to filtered selections by content type (e.g. Sports), provider (e.g. ESPN), down to programming choices related to specific programming (e.g. a football game). Each contextual level of navigation from the most general to the most specific with respect to the current content, will now be described in detail.

Figure 3:
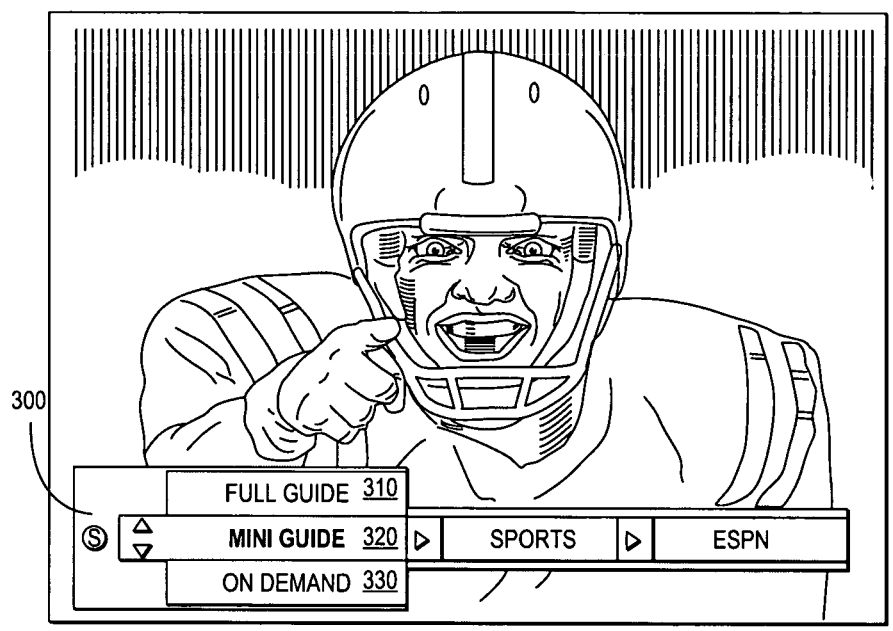
FIG. 3 illustrates an exemplary user interface for selecting the contextual navigation control mode, according to one embodiment of the present invention.
Figure 4:
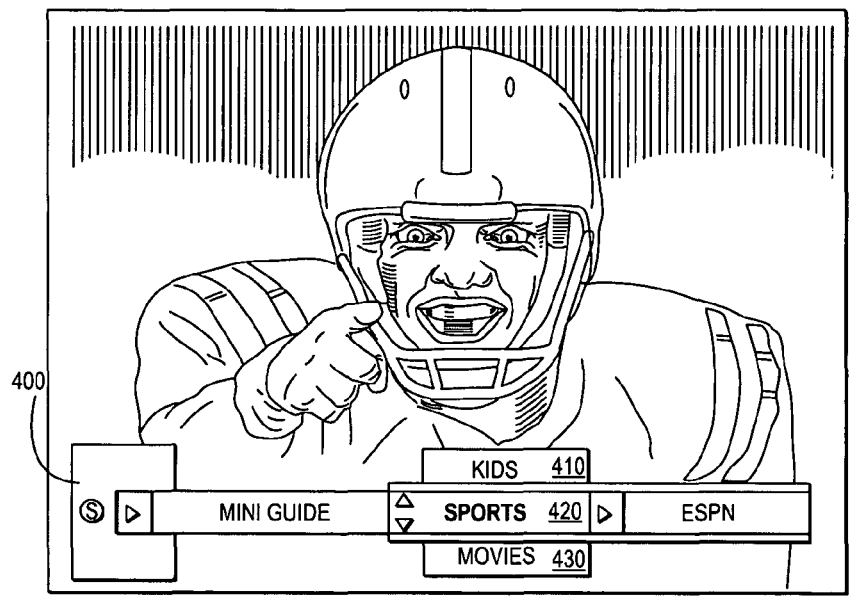
FIG. 4 illustrates an exemplary user interface 400 for selecting category related links, according to one embodiment of the present invention.

Level one (All Listings 210) represents the links to general system functions, in particular, it allows the user to select how he/she wishes to interact with the present contextual navigation control. FIG. 3 illustrates an exemplary user interface for selecting the contextual navigation control mode, according to one embodiment of the present invention. The control mode interface 300 includes the following viewing
  1 Full Guide 310: Full Screen Guide of linear programming choices (either blocking video or with video inset)
  2 Mini-Guide 320: Overscreen guide to linear programming to allow for content selection with continued viewing of current programming
  3 On-Demand Guide 330: Guide to On-Demand programming. In some embodiments, this may be combined with the other guides.
  4 Favorites (not shown): list of content selections for user's favorite categories
  5 My VOD (not shown): list of On-Demand content according to selection rules provided by user
  6 My DVR Shows (not shown): list of previously recorded programs Returning to FIG. 2, level two (category related links 220) represents a contextual level of navigation where programming content is ordered according to relevance by content category. The category related links level 220 consists of content categories where the category contextually presented is the one most relevant to the category of content currently being viewed. In one embodiment, the category related links level link 220 navigates the viewer to the 'category application'. The present contextual navigation control provides a method for quickly jumping to the most relevant catagory based on the currently viewed program. For example, FIG. 4 illustrates an exemplary user interface 400 for selecting category related links, according to one embodiment of the present invention. In this example, if the viewer is currently watching a football game then the 'Sports' category link 420 would be the item shown in the initial state of the contextual navigation control. As a further example, in situations where a viewer is watching a movie, the initial state of the second level 220 of the present contextual navigation control would be 'Movies' 430. Further examples are illustrated Table 1 below.

TABLE 1

| Currently viewed program type | Initial Category Link |
|---|---|
| Football | Sports 420 |
| Movie | Movies 430 |
| Sesame Street | Kids 410 |
| HD program | HD (not shown) |
| Headline News | News (not shown) |

In this manner, the contextual display and dynamic positioning of the relevant links related to a current program, provider, category or genre of same, will assist the viewer to more quickly navigate to the programming they desire. The possible links are also navigable by the viewer once the selection is moved to highlight an element of the present contextual navigation control, as illustrated by FIG. 4. In other words, a viewer may navigate to and select the Kids link 410 or the Movies link 430 upon highlighting the Sports link 420 and in so doing expose further category selections.

Returning to FIG. 2, level three (Channel/Provider Related link 230) represents an additional order of relevance. This level consists of channel specific links where the channel category link contextually presented is the one most relevant to the category of content currently being viewed. This 'programmer category application' can be implemented as a category application or can be any content provided for the current channel or channel family to which this channel belongs. For example, in the examples of FIGS. 3 and 4, the viewer has selected a football game that sets the second level link 220 state to 'Sports' 420 initially.

Figure 5:
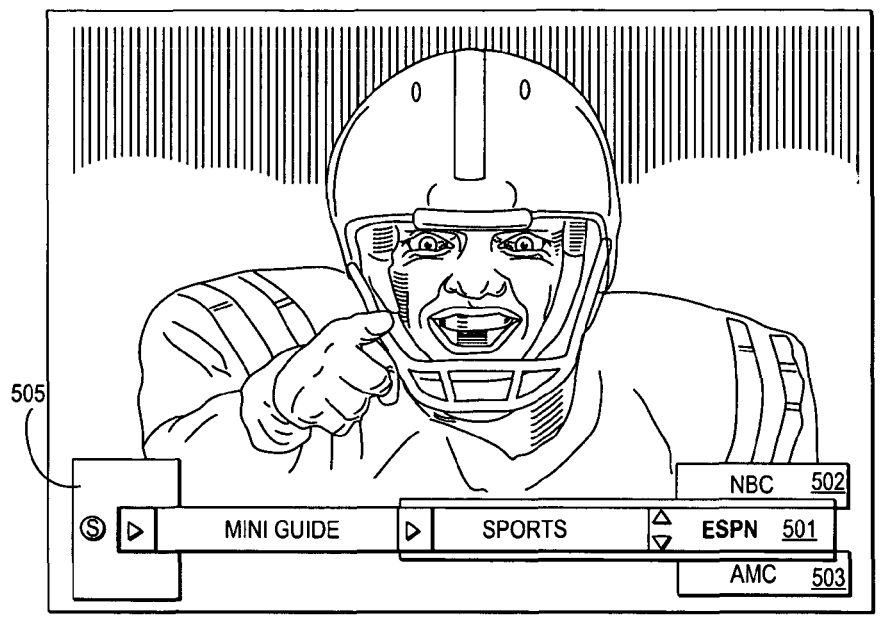
FIG. 5 illustrates an exemplary user interface 505 for selecting channel/provider related links, according to one embodiment of the present invention.

For the purpose of illustrating the third level's relevance (Channel/Provider Related link 230), FIG. 5 illustrates an exemplary user interface 505 for selecting channel/provider related links, according to one embodiment of the present invention. Continuing with the examples shown in FIGS. 3 and 4, FIG. 5 illustrates that the football game is on ESPN. Given that the viewer is watching the football game on ESPN, when the navigation control 505 is launched, the initial state of third level (Channel/Provider Related link 230) will be 'ESPN' 501. This permits the viewer to jump directly to a sports category 501 to see what other sports programming is available on other networks, such as NBC 502, or AMC 503. Additionally, the viewer can jump to a provider category by selecting ESPN 501 to see what other programming and information ESPN is providing. Further examples of relationships between currently viewed channel and the initial option display for the channel/provider link level 230 are shown in Table 2 below.

TABLE 2

| Currently viewed channel | The Initial Channel Link |
|---|---|
| ESPN | ESPN |
| Discovery | Discovery |
| Discovery Wings | Discovery |
| TLC | Discovery |
| Headline News | News |

The 'Discovery' example is provided to illustrate that multiple channels may link to a single channel-family content application. All of the possible links are also navigable by the viewer once the selection is moved to highlight this element of the contextual navigation control.

Returning to FIG. 2, level four (Show/Content Related links 240) represents an additional order of relevance. The show/content level 240 consists of program or show specific links where the channel program link (contextually) presented is the one most relevant to the content currently being viewed. For example, if the current program being viewed is the ESPN show "Pardon the Interruption", this link could in one embodiment be an interactive application for "Pardon the Interruption". In one embodiment, the other links available in this level could be interactive applications for programs or shows that share some attribute in common with the current program being viewed.

It will also be apparent that the relationships to categories may be specified in any manner and may contain additional levels of relevance. For instance, in the example of a viewer watching football on ESPN, the first order of relevance was content category (sports), the second order of relevance was the current channel (ESPN), a third order of relevance can be added to be specific to the program. For example if the game were a college game between LSU and Florida then an additional order of relevance might be a link to an application for 'College football' or for 'South-Eastern Conference'.

An Exemplary Network Architecture

Figure 6:
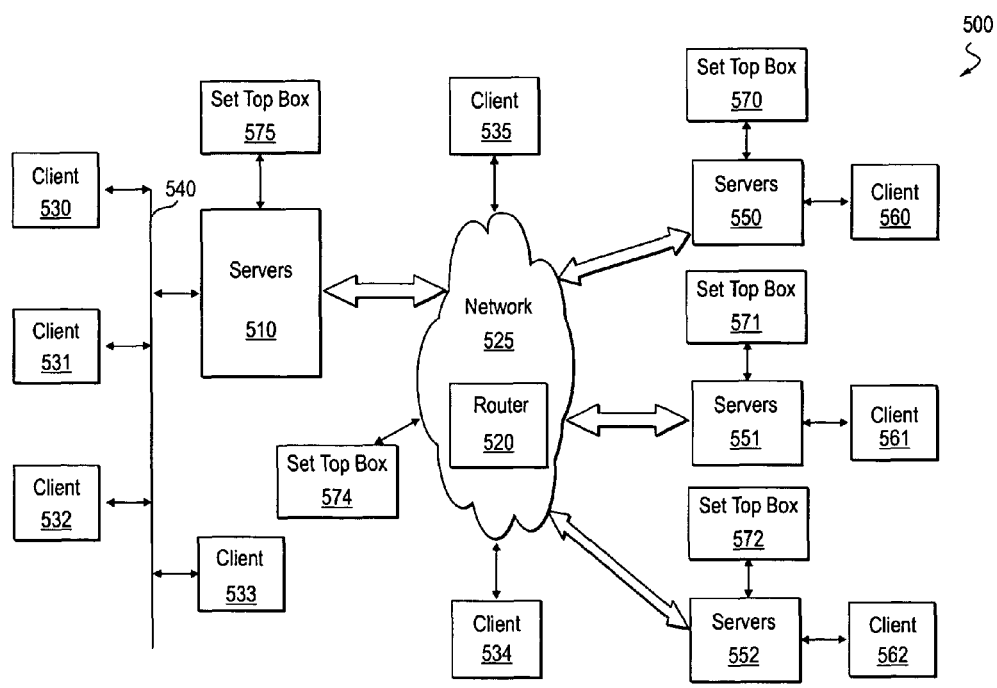
FIG. 6 illustrates an exemplary network architecture, according to one embodiment of the present invention.

Elements of the present invention may be included within a client-server based system 500 such as that illustrated in FIG. 6. According to the embodiment depicted in FIG. 6, one or more servers 510 communicate with a plurality of clients 530-535 and set-top boxes 570-575. The clients and set-top boxes 530-535 and set-top boxes 570-575 may transmit and receive data from servers 510 over a variety of communication media including (but not limited to) a local area network ("LAN") 540 and/or a wide area network ("WAN") 525 (e.g., the Internet). Alternative communication channels such as cable RF and wireless communication via GSM, TDMA, CDMA or satellite broadcast (not shown) are also contemplated within the scope of the present invention.

Servers 510 may include a database for storing various types of data. This may include, for example, specific client data (e.g., user account information and user preferences) and/or more general data. The database on servers 510 in one embodiment runs an instance of a Relational Database Management System (RDBMS), such as Microsoft™ SQL-Server, Oracle™ or the like. A user/client may interact with and receive feedback from servers 510 using various different communication devices and/or protocols. According to one embodiment, a user connects to servers 510 via client software. The client software may include a browser application such as Netscape Navigator™ or Microsoft Internet Explorer™ on the user's personal computer, which communicates to servers 510 via the Hypertext Transfer Protocol (hereinafter "HTTP"). In other embodiments included within the scope of the invention, clients may communicate with servers 510 via cellular phones and pagers (e.g., in which the necessary transaction software is electronic in a microchip), handheld computing devices, and/or touch-tone telephones (or video phones). According to another embodiment, set-top boxes 570-575 connects to servers 510 via a TV application.

Servers 510 may also communicate over a larger network (e.g., network 525) with other servers 550-552. This may include, for example, servers maintained by businesses to host their Web sites—e.g., content servers such as "yahoo.com." Network 525 may include router 520. Router 520 forwards data packets from one local area network (LAN) or wide area network (WAN) to another. Based on routing tables and routing protocols, router 520 reads the network address in each IP packet and makes a decision on how to send if based on the most expedient route. Router 520 works at layer 3 in the protocol stack.

An Exemplary Computer Architecture

Figure 7:
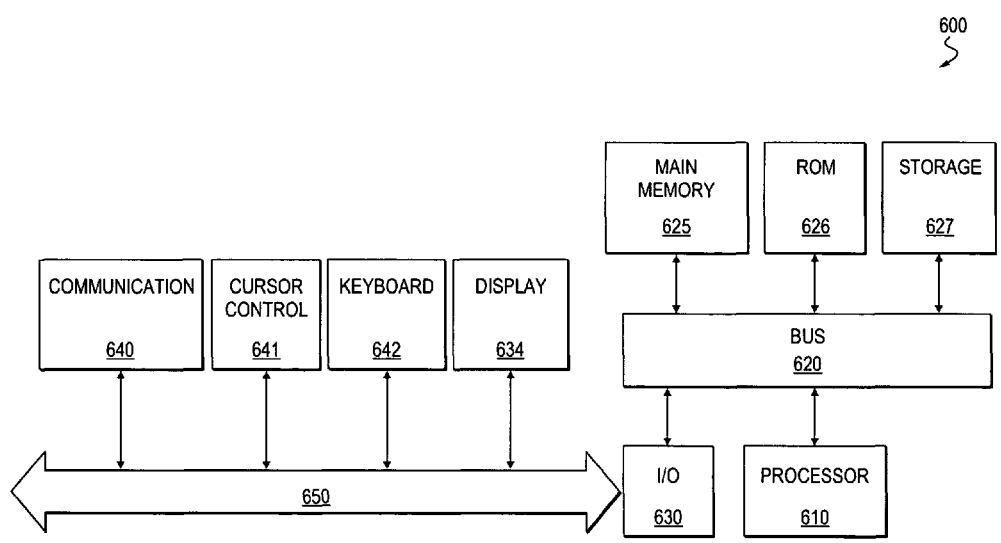
FIG. 7 illustrates an exemplary computer architecture, according to one embodiment of the present invention.

Having briefly described an exemplary network architecture which employs various elements of the present invention, a computer system 600 representing exemplary clients 530-535, set-top boxes 570-575 (e.g., set-top box 130) and/or servers (e.g., servers 510), in which elements of the present invention may be implemented will now be described with reference to FIG. 7.

One embodiment of computer system 600 comprises a system bus 620 for communicating information, and a processor 610 coupled to bus 620 for processing information. Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and/or other static storage device 626 coupled to bus 620 for storing static information and instructions used by processor 610.

A data storage device 627 such as a magnetic disk or optical disc and its corresponding drive may also be coupled to computer system 600 for storing information and instructions. Computer system 600 can also be coupled to a second I/O bus 650 via an I/O interface 630. Multiple I/O devices may be coupled to I/O bus 650, including a display device 643, an input device (e.g., an alphanumeric input device 642 and/or a cursor control device 641). For example, video news clips and related information may be presented to the user on the display device 643.

The communication device 640 is for accessing other computers (servers or clients) via a network 525, 540. The communication device 640 may comprise a modem, a network interface card, or other well-known interface device, such as those used for coupling to Ethernet, token ring, or other types of networks.

A contextual navigational control for digital television has been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus comprising:
a processor; and
memory storing instructions that, when executed by the processor, cause the apparatus to:
generate a programming guide user interface comprising a menu that includes a plurality of levels arranged from general to specific, a first of the plurality of levels displaying a category of programming options, wherein the category of programming options is dynamically selected based on a category of programming associated with a program currently displayed, the program currently displayed having been selected by a user controlling the apparatus;
overlay the programming guide user interface on the program currently displayed to allow for content selection by the user with continued viewing of the program currently displayed; and
in response to a user selection of the category of programming options:
regenerate the programming guide user interface comprising the menu, the menu simultaneously displaying the first of the plurality of levels and a second of the plurality of levels, the first of the plurality of levels displaying the category of programming options and the second of the plurality of levels displaying a subsidiary category of programming options, wherein the subsidiary category of programming options comprises a sub-category of programming options of the category of programming options dynamically selected by the processor based on a subsidiary category of programming associated with the program currently displayed; and
overlay the regenerated programming guide user interface on the program currently displayed to allow for content selection by the user with continued viewing of the program currently displayed.

2. The apparatus of claim 1, wherein the category of programming options is one of a plurality of programming options, and wherein no other of the plurality of programming options are simultaneously displayed by the menu.

3. The apparatus of claim 1, wherein the category of programming options is displayed in close proximity to a plurality of other categories of programming options, and wherein the category of programming options is highlighted in relation to the plurality of other categories of programming options.

4. The apparatus of claim 1, wherein the subsidiary category of programming options is displayed in close proximity to a plurality of other subsidiary categories of programming options, and wherein the subsidiary category of programming options is highlighted in relation to the plurality of other subsidiary categories of programming options.

5. The apparatus of claim 1, wherein the subsidiary category of programming options comprises a common link for a family of programming providers.

6. A method comprising:
generating, at an apparatus comprising a processor, a programming guide user interface comprising a menu that includes a plurality of levels arranged from general to specific, a first of the plurality of levels displaying a category of programming options, wherein the category of programming options is dynamically selected based on a category of programming associated with a program currently displayed, the program currently displayed having been selected by a user controlling the apparatus;
overlaying the programming guide user interface on the program currently displayed to allow for content selection by the user with continued viewing of the program currently displayed; and
in response to a user selection of the category of programming options:
regenerating the programming guide user interface comprising the menu, the menu simultaneously displaying the first of the plurality of levels and a second of the plurality of levels, the first of the plurality of levels displaying the category of programming options and the second of the plurality of levels displaying a subsidiary category of programming options, wherein the subsidiary category of programming options comprises a sub-category of programming options of the category of programming options dynamically selected by the processor based on a subsidiary category of programming associated with the program currently displayed; and
overlaying the regenerated programming guide user interface on the program currently displayed to allow for content selection by the user with continued viewing of the program currently displayed.

7. The method of claim 6, wherein the category of programming options is one of a plurality of programming options, and wherein no other of the plurality of programming options are simultaneously displayed by the menu.

8. The method of claim 6, wherein the category of programming options is displayed in close proximity to a plurality of other categories of programming options, and wherein the category of programming options is highlighted in relation to the plurality of other categories of programming options.

9. The method of claim 6, wherein the subsidiary category of programming options is displayed in close proximity to a plurality of other subsidiary categories of programming options, and wherein the subsidiary category of programming options is highlighted in relation to the plurality of other subsidiary categories of programming options.

10. The method of claim 6, wherein the subsidiary category of programming options comprises a common link for a family of programming providers.

11. The method of claim 6, wherein the apparatus comprises at least one of a set-top box, a computer, a cellular phone, a pager, a handheld computing device, or a touch-tone telephone.

12. The method of claim 6, further comprising, in response to a user selection of the sub-category of programming options:
   regenerating the programming guide user interface comprising the menu, the menu simultaneously displaying the first of the plurality of levels, the second of the plurality of levels, and a third of the plurality of levels, the first of the plurality of levels displaying the category of programming options, the second of the plurality of levels displaying the subsidiary category of programming options, and the third of the plurality of levels displaying a second subsidiary category of programming options, wherein the second subsidiary category of programming options comprises at least one interactive application for a program that shares at least one attribute in common with the program currently displayed.

13. A system comprising:
   a client device configured to:
      generate a programming guide user interface based at least in part on data received from a server, the programming guide user interface comprising a menu that includes a plurality of levels arranged from general to specific, a first of the plurality of levels displaying a category of programming options, wherein the category of programming options is dynamically selected based on a category of programming associated with a program currently displayed, the program currently displayed having been selected by a user controlling the client device;
      overlay the programming guide user interface on the program currently displayed to allow for content selection by the user with continued viewing of the program currently displayed; and
      responsive to a user selection of the category of programming options:
         regenerate the programming guide user interface comprising the menu, the menu simultaneously displaying the first of the plurality of levels and a second of the plurality of levels, the first of the plurality of levels displaying the category of programming options and the second of the plurality of levels displaying a subsidiary category of programming options, wherein the subsidiary category of programming options comprises a sub-category of programming options of the category of programming options dynamically selected by the processor based on a subsidiary category of programming associated with the program currently displayed; and
         overlay the regenerated programming guide user interface on the program currently displayed to allow for content selection by the user with continued viewing of the program currently displayed.

14. The system of claim 13, wherein the category of programming options is displayed in close proximity to a plurality of other categories of programming options, and wherein the category of programming options is highlighted in relation to the plurality of other categories of programming options.

15. The system of claim 13, wherein the subsidiary category of programming options is displayed in close proximity to a plurality of other subsidiary categories of programming options, and wherein the subsidiary category of programming options is highlighted in relation to the plurality of other subsidiary categories of programming options.

16. The system of claim 13, wherein the subsidiary category of programming options comprises a common link for a family of programming providers.

17. The system of claim 13, wherein the client device is configured to receive the data from the server via at least one of a local area network, a wide area network, a cable radio frequency (RF) network, a global system for mobile communications (GSM) network, a time division multiple access (TDMA) network, a code division multiple access (CDMA) network, or a satellite broadcast network.

* * * * *

UNITED STATES PATENT AND TRADEMARK OFFICE
CERTIFICATE OF CORRECTION

PATENT NO. : 8,819,734 B2
APPLICATION NO. : 10/925737
DATED : August 26, 2014
INVENTOR(S) : Samuel Moreau et al.

It is certified that error appears in the above-identified patent and that said Letters Patent is hereby corrected as shown below:

In the Specification

Column 5, Detailed Description, Line 64:
  Please delete "Snow" and insert --Show--

Column 6, Detailed Description, Line 12:
  After "viewing", insert --modes:--

Column 6, Detailed Description, Line 36:
  Delete "catagory" and insert --category--

Column 8, Detailed Description, Line 53:
  Delete "130" and insert --132--

Signed and Sealed this
Twenty-ninth Day of September, 2015

Michelle K. Lee
*Director of the United States Patent and Trademark Office*